(12) United States Patent
Kumar et al.

(10) Patent No.: US 8,782,187 B2
(45) Date of Patent: Jul. 15, 2014

(54) SYSTEM, DEVICE, AND METHOD FOR MONITORING COMMUNICATION IN A WIND FARM NETWORK

(75) Inventors: Vivek Kumar, Bihar (IN); Hemanth A Kumar, Karnataka (IN); Chery Jose, Kerala (IN)

(73) Assignee: General Electric Company, Schenectady, NY (US)

( * ) Notice: Subject to any disclaimer, the term of this patent is extended or adjusted under 35 U.S.C. 154(b) by 711 days.

(21) Appl. No.: 12/548,036

(22) Filed: Aug. 26, 2009

(65) Prior Publication Data
US 2010/0138751 A1    Jun. 3, 2010

(51) Int. Cl.
*G06F 15/16* (2006.01)

(52) U.S. Cl.
USPC .......................................... 709/223; 709/224

(58) Field of Classification Search
USPC .................................. 709/223, 224
See application file for complete search history.

(56) References Cited

U.S. PATENT DOCUMENTS

| | | | |
|---|---|---|---|
| 6,041,349 A | 3/2000 | Sugauchi et al. | |
| 6,397,359 B1 * | 5/2002 | Chandra et al. | 714/712 |
| 6,529,589 B1 | 3/2003 | Nelson et al. | |
| 6,850,253 B1 * | 2/2005 | Bazerman et al. | 715/734 |
| 2006/0184665 A1 | 8/2006 | Reister et al. | |
| 2007/0258508 A1 | 11/2007 | Werb et al. | |
| 2008/0045179 A1 * | 2/2008 | Bekanich et al. | 455/405 |
| 2008/0235373 A1 * | 9/2008 | Haley et al. | 709/224 |
| 2009/0043504 A1 * | 2/2009 | Bandyopadhyay et al. | 701/213 |
| 2009/0210200 A1 * | 8/2009 | Kunft et al. | 702/188 |
| 2010/0228854 A1 * | 9/2010 | Morrison et al. | 709/224 |

FOREIGN PATENT DOCUMENTS

| | | |
|---|---|---|
| EP | 1722102 A1 | 11/2006 |
| EP | 1850563 A1 | 10/2007 |

OTHER PUBLICATIONS

European Search Report and Written Opinion issued in connection with EP Application No. 10171954.0, Jan. 7, 2011.

* cited by examiner

*Primary Examiner* — Kenny Lin
(74) *Attorney, Agent, or Firm* — James McGinness; Armstrong Teasdale LLP (57) ABSTRACT

A method for monitoring communication in a wind farm network. A server is attached to one or more network nodes in a wind farm network. The server determines whether it is capable of communicating with each of the network nodes and reports the results as a network state. A graphical representation of the network state may be displayed to a user.

19 Claims, 7 Drawing Sheets

SYSTEM, DEVICE, AND METHOD FOR MONITORING COMMUNICATION IN A WIND FARM NETWORK

BACKGROUND OF THE INVENTION

The field of the invention relates generally to monitoring wind farm networks and, more particularly, to remotely monitoring which nodes in such a network are reachable by a server at a given time.

A wind farm includes one or more wind turbines, which utilize wind energy to generate or produce electrical power. A wind turbine typically includes one or more components (e.g., a controller and/or sensors) attached to a wind farm network. Other devices on the network, such as a server, may receive data from the networked components in a wind turbine for purposes such as wind farm management and production reporting. Proper operation of a wind farm, therefore, requires continued communication with each networked component. Further, in some configurations, loss of communication with one or more networked components may render additional networked components unreachable, as well. Ensuring such communication failures can be detected quickly and conveniently is essential to effective wind farm operation.

BRIEF DESCRIPTION OF THE INVENTION

In one aspect, a system is provided for monitoring a status of communication in a wind farm network from a remote device. The system includes a first wind turbine, which includes a first network node communicatively coupled to the wind farm network. The system also includes a server. The server includes a first communication interface that is communicatively coupled to the wind farm network and configured to determine a first connection status for the first network node. The first connection status indicates whether the server is capable of communicating with the first network node. The server also includes a second communication interface that is communicatively coupled to the remote device and configured to transmit a network state including the first connection status to the remote device. The server also includes a first processor that is operatively coupled to the first communication interface and the second communication interface.

In another aspect, a device is provided for displaying a network state of a wind farm network. The wind farm network includes a server that is communicatively attached to a plurality of wind farm network nodes. The wind farm network state includes a plurality of wind farm network node states. Each wind farm network node state corresponds to a wind farm network node and includes a link state. The device includes a communication interface that is communicatively attachable to the server and configured to receive the network state from the server. The device also includes a display device that is configured to display a graphical representation of the received network state. The displayed graphical representation depicts the plurality of wind farm network node states and the link states associated with the plurality of wind farm network node states.

In another aspect, a method is provided for presenting a communication status in a wind farm network. The wind farm network includes a server and a plurality of network nodes. The method includes requesting the communication status from the server, receiving the communication status from the server, and displaying on a display device a graphical representation of the communication status. The communication status includes a plurality of connection indicators, each of which indicates whether the server is capable of communicating with a corresponding network node in the wind farm network.

DETAILED DESCRIPTION OF THE INVENTION

The embodiments described herein provide information regarding communication in a wind farm network. A server on a wind farm network determines and reports the status of communication between the server and one or more wind farm network nodes. The communication status may be reported to a remote device, which displays a graphical representation of the communication status. Visual cues, such as color coding of network connections according to status, may be employed to allow a user to quickly evaluate the status of the wind farm network as a whole.

An exemplary technical effect of the methods, system, and apparatus described herein includes at least one of (a) requesting, from a server, a communication status that includes a plurality of connection indicators, each of which indicates whether the server is capable of communicating with a corresponding network node in a wind farm network; (b) receiving the communication status from the server; and (c) displaying on a display device a graphical representation of the communication status.

As used herein, the term wind turbine is intended to be representative of any device that generates rotational energy from wind energy and, more specifically, converts kinetic energy of wind into mechanical energy.

Figure 1:
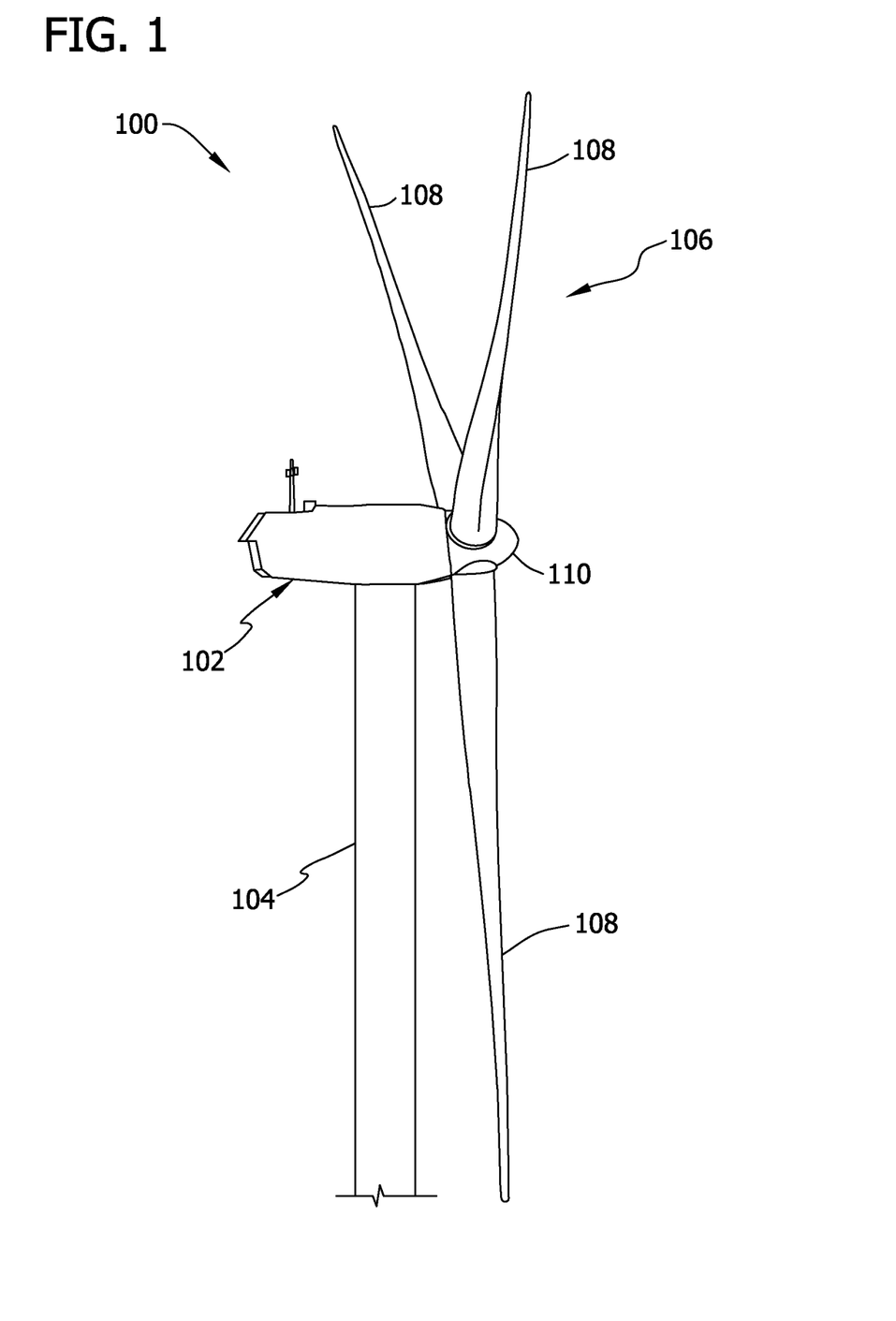
FIG. 1 is a schematic view of an exemplary wind turbine.

FIG. 1 is a schematic view of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may be any height that facilitates operation of wind turbine 100 as described herein. Wind turbine 100 also includes a rotor 106 that includes three rotor blades 108 attached to a rotating hub 110. Alternatively, wind turbine 100 includes any number of rotor blades 108 that facilitate operation of wind turbine 100 as described herein. In the exemplary embodiment, wind turbine 100 includes a gearbox (not shown in FIG. 1) rotatingly coupled to rotor 106 and to the generator.

Figure 2:
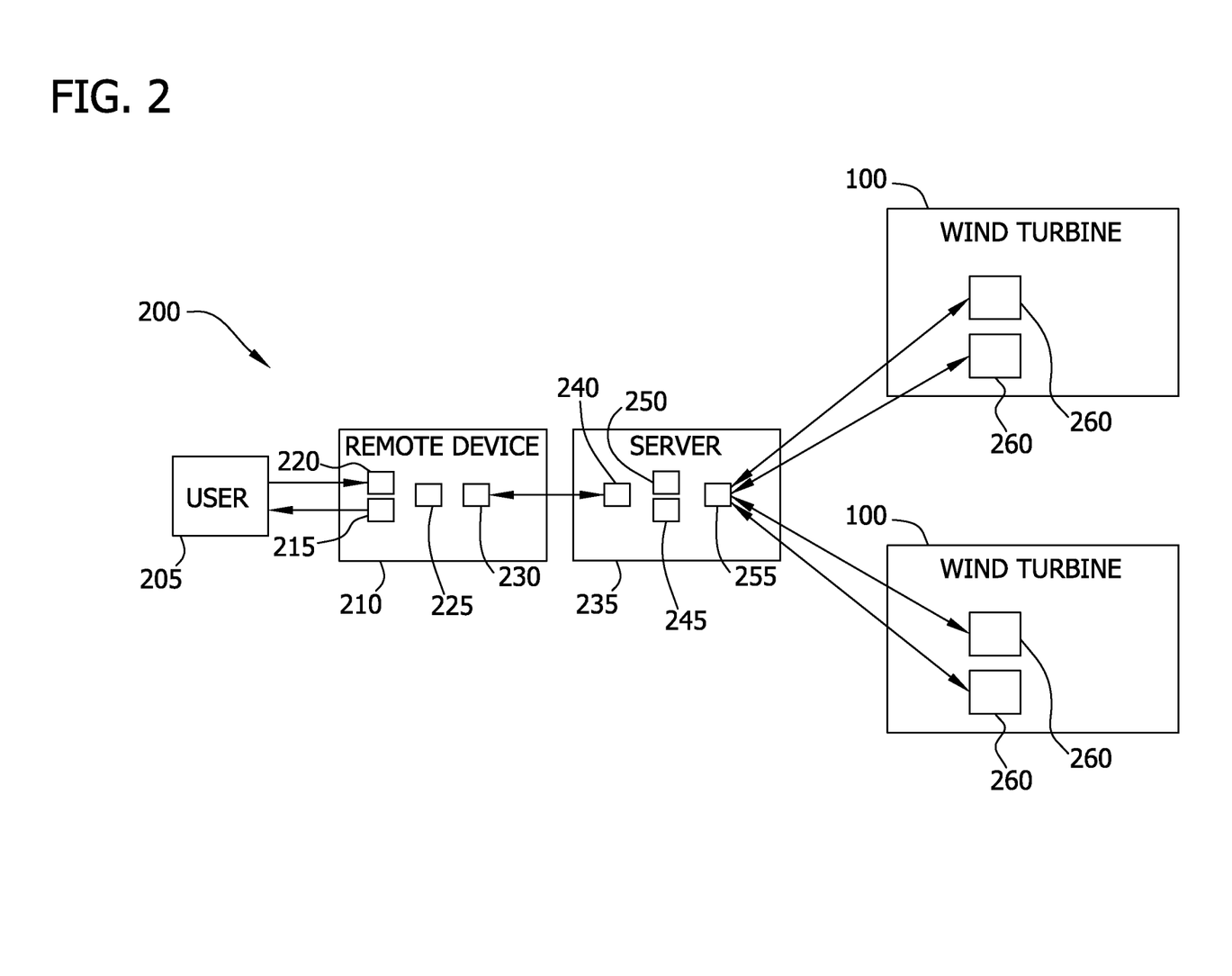
FIG. 2 is a block diagram illustrating an exemplary system for monitoring a status of communication in a wind farm network using a remote device.

FIG. 2 is a block diagram illustrating an exemplary system 200 for monitoring the status of communication in a wind farm network using a remote device. System 200 is designed for use by a user 205 accessing a remote device 210. User 205 interacts with remote device 210 by viewing information from a display device 215 and, optionally, manipulating a user interface using a user input device 220. Remote device 210 includes a processor 225 for executing instructions. Processor 225 is operatively coupled to display device 215 and, if present, user input device 220. Processor 225 is also operatively coupled to a communication interface 230, which is communicatively attachable to a server 235.

Remote device 210 is any device capable of accessing server 235 and interacting with user 205. By way of example only, and not limitation, remote device 210 may include a laptop computer, a desktop computer, a set-top box, an electronic book reader, a digital music player, a cellular phone, and/or a smart phone. Remote device 210 includes a processor 225 for executing software instructions. User input device 220 may include, for example, a keyboard, a keypad, a pointing device, a touch sensitive screen, and/or an audio input device. Display device 215 may include, for example, a graphical display device or a printer.

Remote device 210 receives information from server 235 via communication interface 230, which may be communicatively coupled to a communication interface 240 of server 235. Server 235 transmits data (e.g., representing communication status in a wind farm network) using communication interface 240. Remote device 210 receives the data using communication interface 230. In certain embodiments, server 235 initiates communication. Alternatively, remote device 210 initiates communication by issuing a request to server 235 using communication interface 230, and server 235 responds by transmitting the data. Requests and responses may take various forms. For example, remote device 210 may issue a Hypertext Transfer Protocol (HTTP) request to server 235, and server 235 may generate and transmit an HTTP response including Hypertext Markup Language (HTML), Extensible Hypertext Markup Language (XHTML), and/or Extensible Markup Language (XML). Remote device 210 and server 235 may communicate using a protocol such as Simple Object Access Protocol (SOAP) or Representational State Transfer (REST). Server 235 may also or instead transmit serialized application object data and/or a graphical image representing the wind farm network communication status.

Server 235 also includes a processor 245 and may include a memory 250 for storing data (e.g., representing nodes in a wind farm network). Processor 245 is operatively coupled to memory 250 (if present), communication interface 240 and one or more additional communication interface 255, which is communicatively coupled to wind turbines 100. Each wind turbine 100 includes at least one network node 260. A network node 260 may include a controller, a sensor, a network switch, a network router, or any other device useful for operation of a wind turbine 100 and communicatively attachable to communication interface 255 of server 235.

In some embodiments, wind turbine 100 includes a controller as a network node 260. A controller may be attached to one or more sensors (e.g., an ambient air temperature sensor, a wind direction and/or speed sensor, a blade pitch sensor, a turbine speed sensor, a temperature sensor, a voltage sensor, and/or a current sensor; not shown) of wind turbine 100. In one embodiment, sensors may be communicatively coupled directly to server 235. Alternatively, sensors may be attached to the controller via a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, or a private (i.e., not accessible by server 235) network connection, whether wired or wireless.

Communication between remote device 210 and server 235 and communication between server 235 and network nodes 260 may occur in a variety of forms. For example, devices may communicate using a wired network connection (e.g., Ethernet or an optical fiber), radio frequency (RF), BLUETOOTH, an IEEE 802.11 standard (e.g., 802.11(g) or 802.11(n)), Worldwide Interoperability for Microwave Access (WIMAX), a cellular phone technology (e.g., the Global Standard for Mobile communication (GSM)), or any other suitable communication means. Communication interfaces 230, 240, and 255 therefore correspond to the form of communication used. Remote device 210, server 235, and network nodes 260 may include multiple communication interfaces to support additional forms of communication, or multiple forms of communication may be supported by a single communication interface. Devices such as remote device 210, server 235, and network nodes 260 may be communicatively coupled directly or indirectly. For example, remote device 210 may communicate with server 235 through a network such as a local area network (LAN), a wide area network (WAN), the Internet, or any other network suitable for communicating with server 235.

The communicative coupling of network nodes 260 to server 235 and/or to each other may, by itself, create a wind farm network. For example, communication interface 255 and/or network nodes 260 may be arranged in a wireless mesh network, such that each member of the network transmits data, receives data, and relays data intended for another member of the network. Alternatively, the wind farm network may include network hardware such as wired and/or wireless routers, switches, wireless access points, and/or cable for data transmission. If using a wireless form of communication, server 235 or a network node 260 may transmit and receive data through a directional or omni-directional antenna.

In one embodiment, a system such as system 200 is provided for monitoring a status of communication in a wind farm network from a remote device 210. System 200 includes a first wind turbine 100, which includes a first network node 260 communicatively coupled to the wind farm network. System 200 also includes a server 235. Server 235 includes a first communication interface 255 that is communicatively coupled to the wind farm network and configured to determine a first connection status for first network node 260. The first connection status indicates whether server 235 is capable of communicating with first network node 260. Server 235 also includes a second communication interface 240 that is communicatively coupled to remote device 210 and configured to transmit a network state including the first connection status to remote device 210. Server 235 also includes a first processor 245 that is operatively coupled to first communication interface 255 and second communication interface 240.

In addition to indicating whether server 235 is capable of communicating with network node 260, a connection status may include information such as a network address of network node 260, a hardware identifier of network node 260, a quantity of data transmitted by network node 260, a quantity of data received by network node 260, an elapsed time since server 235 became capable of communicating with network node 260, and a date and a time at which server 235 became capable of communicating with network node 260.

Remote device 210 may include a third communication interface 230 that communicatively couples second communication interface 240 to remote device 210. Third communication interface 230 is configured to receive the network state from server 235. Remote device 210 may also include a display device 215 configured to display a graphical representation of the network state. Remote device 210 may further include a second processor 225, which is operatively coupled to third communication interface 230 and display device 215. The graphical representation of the network state may include a graphical representation of server 235, a graphical representation of first network node 260, and a graphical representation of the first connection status.

In one embodiment, the first wind turbine 100 further includes a second network node 260 that, like first network node 260, is communicatively coupled to the wind farm network. First communication interface 255 of server 235 is further programmed to determine a second connection status for second network node 260, the second connection status indicating whether server 235 is capable of communicating with second network node 260. The network state further includes the second connection status.

System 200 may include a second wind turbine 100. The second wind turbine includes at least second network node 260 that is communicatively coupled to the wind farm network. First communication interface 255 is further programmed to determine a second connection status for second network node 260, the second connection status indicating whether server 235 is capable of communicating with second network node 260. The network state further includes the second connection status. As shown in FIG. 2, system 200 may include multiple wind turbines 100, each including multiple network nodes 260.

If system 200 includes multiple network nodes 260, first communication interface 255 of server 235 may be further configured to detect network nodes 260 in the wind farm network. Server 235 may include a memory 250 configured to store a collection of detected network nodes. First communication interface 255 may determine a connection status for each network node in the collection to determine multiple communication statuses. Storing a collection of detected network nodes allows server 235 to identify network node 260 with which it is incapable of communicating even if, because of a malfunctioning connection, server 235 cannot detect network node 260 when reporting the network state. Alternatively, server 235 may include a static collection of expected network nodes. To determine network state, server 235 may attempt to determine a connection status for each expected network node. Server 235 may, for example, attempt to elicit a response from each expected network node. An expected network node that does not respond to server 235 may be treated as one with which server 235 is incapable of communicating.

In another embodiment, a device such as remote device 210 is provided for displaying a network state of a wind farm network. The wind farm network includes server 235 that is communicatively attached to a plurality of wind farm network nodes 260. The wind farm network state includes a plurality of wind farm network node states. Each wind farm network node state corresponds to a wind farm network node 260 and includes a link state. Remote device 210 includes a communication interface 230 that is communicatively attachable to server 235 and configured to receive the network state from server 235. Remote device 210 also includes a display device 215 for displaying a graphical representation of the network state. A first portion of display device 215 is configured to display a graphical representation of the plurality of wind farm network node states. A second portion of display device 215 is configured to display a graphical representation of the link states associated with the plurality of wind farm network node states.

A portion of display device 215 such as the first portion or the second portion may include a contiguous section (e.g., a two-dimensional or three-dimensional area) of display device 215 or a graphical layer that can be combined (e.g., overlaid) with other layers. In some embodiments, portions of display device 215 are selectively displayed. For example, display device 215 may be configured to display the first portion and conceal the second portion. In this configuration, display device 215 would display a graphical representation of the wind farm network node states with no graphical representation of the link states. Other methods of apportioning display device 215 are also contemplated.

The link state associated with a wind farm network node state may include a connection indicator having a value of connected if server 235 is capable of communicating with the wind farm network node 260 corresponding to the link state, and having a value of disconnected if server 235 is not capable of communicating with the wind farm network node 260 corresponding to the link state. The second portion of display device 215 may be further configured to graphically distinguish a link state having a connection indicator of connected from a link state having a connection indicator of disconnected.

The link state associated with a wind farm network node state may further include one or more of the following connection details for corresponding wind farm network node 260: a network address of wind farm network node 260, a hardware identifier of wind farm network node 260, a quantity of data transmitted by wind farm network node 260, a quantity of data received by wind farm network node 260, an elapsed time since server 235 became capable of communicating with wind farm network node 260, and a date and a time at which server 235 became capable of communicating with wind farm network node 260. A third portion of display device 215 may be configured to display a graphical representation of one or more connection details for a link state. For example, the third portion may display a bar-type meter indicating a quantity of data transmitted and/or received for the link state (i.e., "bandwidth usage"). Bandwidth usage may additionally, or alternatively, be indicated by color coding or animating the link state (e.g., with a rate of animation directly proportional to the bandwidth usage). Remote device 210 may also include user input device 220 configured to allow a user 205 to select one of the displayed link states. For example, user 205 may manipulate a pointing device to click on or "mouse over" a link state. The third portion of display device 215 may be further configured to display at least one connection detail corresponding to the selected link state.

In some embodiments, each network node 260 is associated with a position. Each wind farm network node state further includes the position of wind farm network node 260 corresponding to the wind farm network node state. The first portion of display device 215 is configured to depict each wind farm network node state based on the position of wind farm network node 260. The position of a wind farm network node may include a physical or geographical location (e.g., longitudinal and latitudinal coordinates) of node 260 or a position of node 260 relative to other devices within the wind farm network. For example, a position of node 260 within the network may be expressed in terms of the other devices in the network to which node 260 is communicatively attached (i.e., neighboring devices). In a ring topology, therefore, the position of node 260 may include an indication of the two devices (e.g., two nodes 260 or server 235 and node 260) that neighbor node 260. In a wireless mesh topology, the position of node 260 may include a collection of all network devices neighboring node 260.

Figure 3:
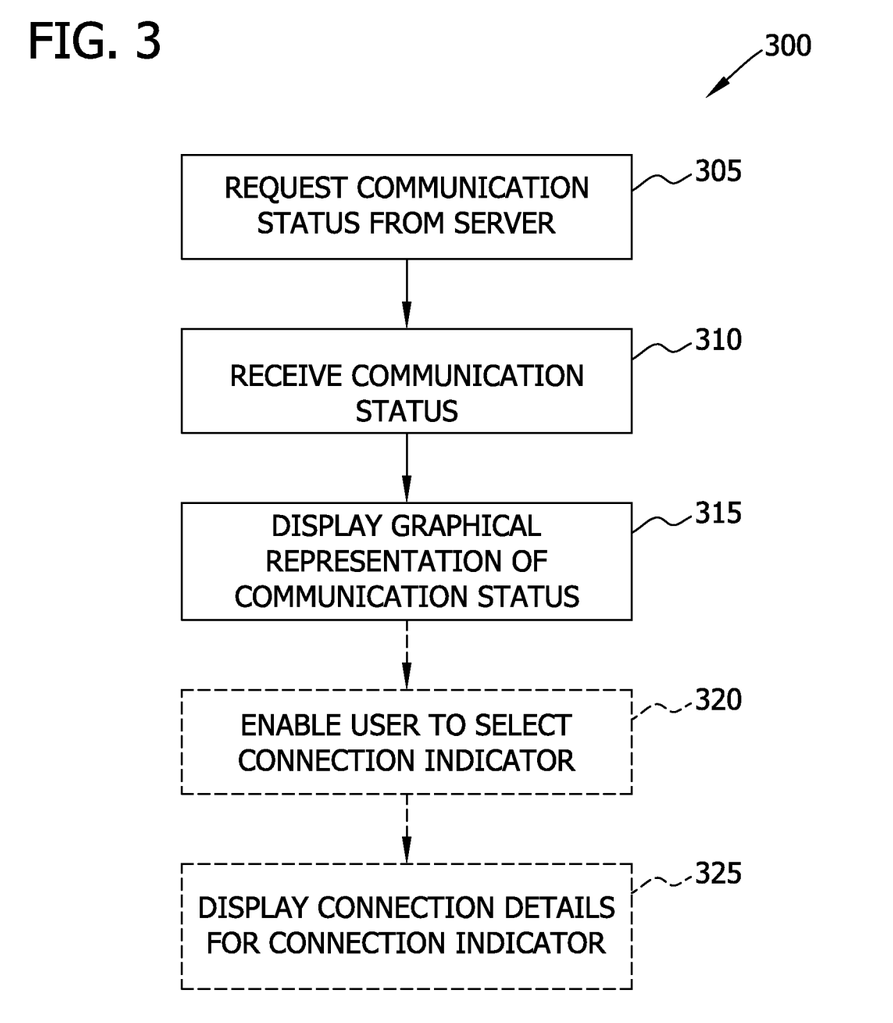
FIG. 3 is a flowchart of an exemplary method for presenting a status of communication in a wind farm network comprising a plurality of network nodes.

FIG. 3 is a flowchart of an exemplary method 300 for presenting a communication status in a wind farm network. The wind farm network includes server 235 and a plurality of network nodes 260. The method includes requesting 305 the communication status from server 235, receiving 310 the communication status from server 235, and displaying 315 on display device 215 a graphical representation of the communication status. The communication status includes a plurality of connection indicators, each of which indicates whether server 235 is capable of communicating with corresponding network node 260 of the plurality of network nodes 260 in the wind farm network.

Receiving 310 the communication status from the server may include receiving (e.g., with a connection indicator) an identifier and/or one or more connection details for each corresponding network node 260. Connection details may include, for example, a network address of network node 260, a hardware identifier of network node 260, a quantity of data transmitted by network node 260, a quantity of data received by network node 260, an elapsed time since server 235 became capable of communicating with network node 260, and a date and a time at which server 235 became capable of communicating with network node 260. The method may further include enabling 320 user 205 to select one of the connection indicators and displaying 325 at least one connection detail for the selected connection indicator.

The graphical representation of the communication status may be displayed 315 by displaying on display device 215 a graphical representation of server 235 and a graphical representation of each connection indicator. In some embodiments, each network node 260 is communicatively coupled to the wind farm network via a type of network connection (e.g., through a switch, a router, or an access point, in a ring configuration, in a star configuration, and/or in a wireless mesh), and the communication status further includes a network topology. The network topology includes a plurality of expected network nodes 260, each of which corresponds to a network node 260 in the wind farm network. The network topology also includes the type of network connection for each of the expected network nodes 260. In such embodiment, displaying 315 the graphical representation of the communication status may include displaying on display device 215 a graphical representation of the network topology.

Figure 4:
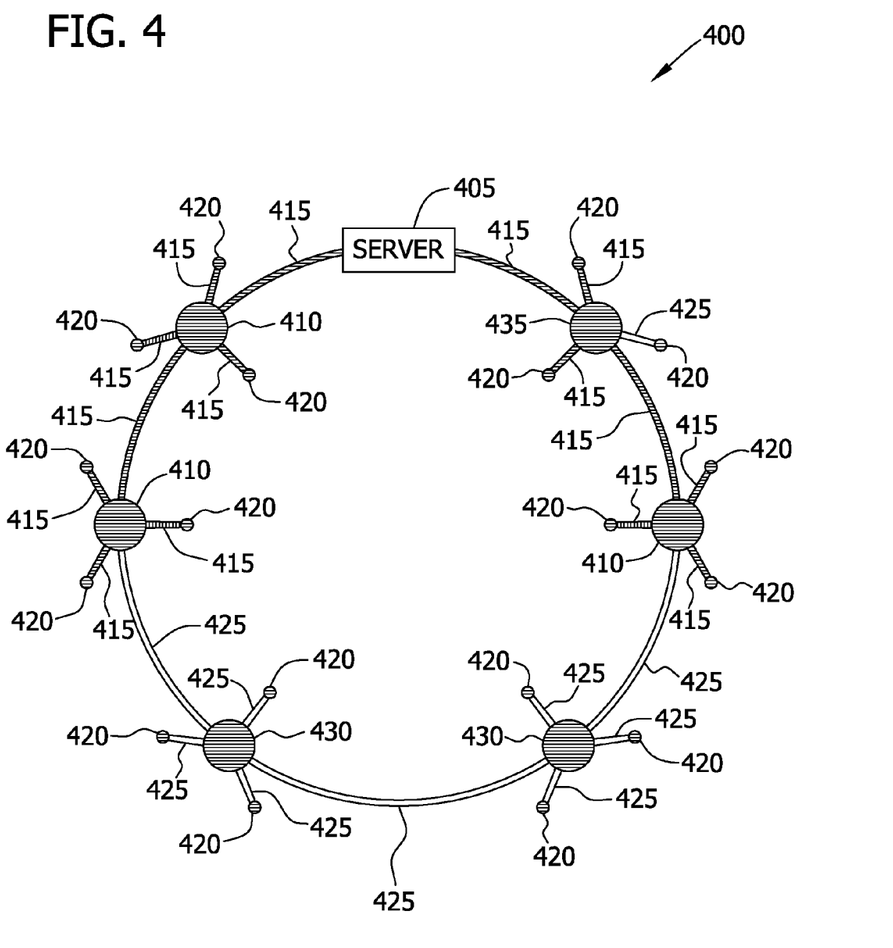
FIG. 4 is an exemplary graphical representation of a communication status in a wind farm network having a ring topology.

FIG. 4 is an exemplary graphical representation 400 of a communication status in a wind farm network having a ring topology. Devices in the network are represented by icons. Presented in graphical representation 400 are a server icon 405 (representing server 235) and six network switch icons 410, 430, and 435. Network switch icons 410, 430, and 435 each represent a network switch, which is a type of network node 260. Network switches are positioned within wind turbines 100, and each network switch is connected to three additional network nodes 260 (e.g., controllers and/or sensors), represented by network node icons 420. Connecting server icon 405 and network switch icons 410, 430, and 435 are wired connection icons 415 and 425. Network switch icons 410, 430, and 435 are also connected to network node icons 420 with wired connection icons 415 and 425. As illustrated in graphical representation 400, in a ring topology, server 235 and each switch are connected to at most two switches.

In the example of FIG. 4, properly functioning connections are represented by hatched wired connection icons 415. Malfunctioning connections are represented by unfilled wired connection icons 425. Properly functioning connections are thereby graphically distinguished from malfunctioning connections. Graphical distinction may be achieved through fill pattern (e.g., the hatching in FIG. 4), color, line weight, or animation (e.g., blinking), though other forms of graphical distinction are also contemplated. Based on the status of the connections associated with it, a switch may be represented by a fully connected switch icon 410, a fully disconnected switch icon 430, or a partially connected switch icon 435. A technique similar to that described for connection icons 415 and 425 may be used to graphically distinguish between fully connected switches, fully disconnected switches, and partially connected switches. A similar technique may also be used to distinguish between network nodes with which a switch is capable of communicating and those with which a switch is incapable of communicating.

A fully connected switch icon 410 indicates a switch that is capable of communicating with all nodes attached to it. A fully disconnected switch icon 430 indicates a switch that is incapable of communicating with any network nodes attached to it and/or incapable of communicating with any other switch. A partially connected switch icon 435 indicates a switch that is capable of communicating with at least one network node attached to it and incapable of communicating with at least one other network node attached to it. In the example of FIG. 4, graphical distinction is applied only to differentiate properly functioning connections from malfunctioning connections 425. Graphical distinction may additionally, or alternatively, be applied to switches and other network nodes 260 based on whether server 235 or a switch is capable of communicating with the switch or other network node 260.

Figure 5:
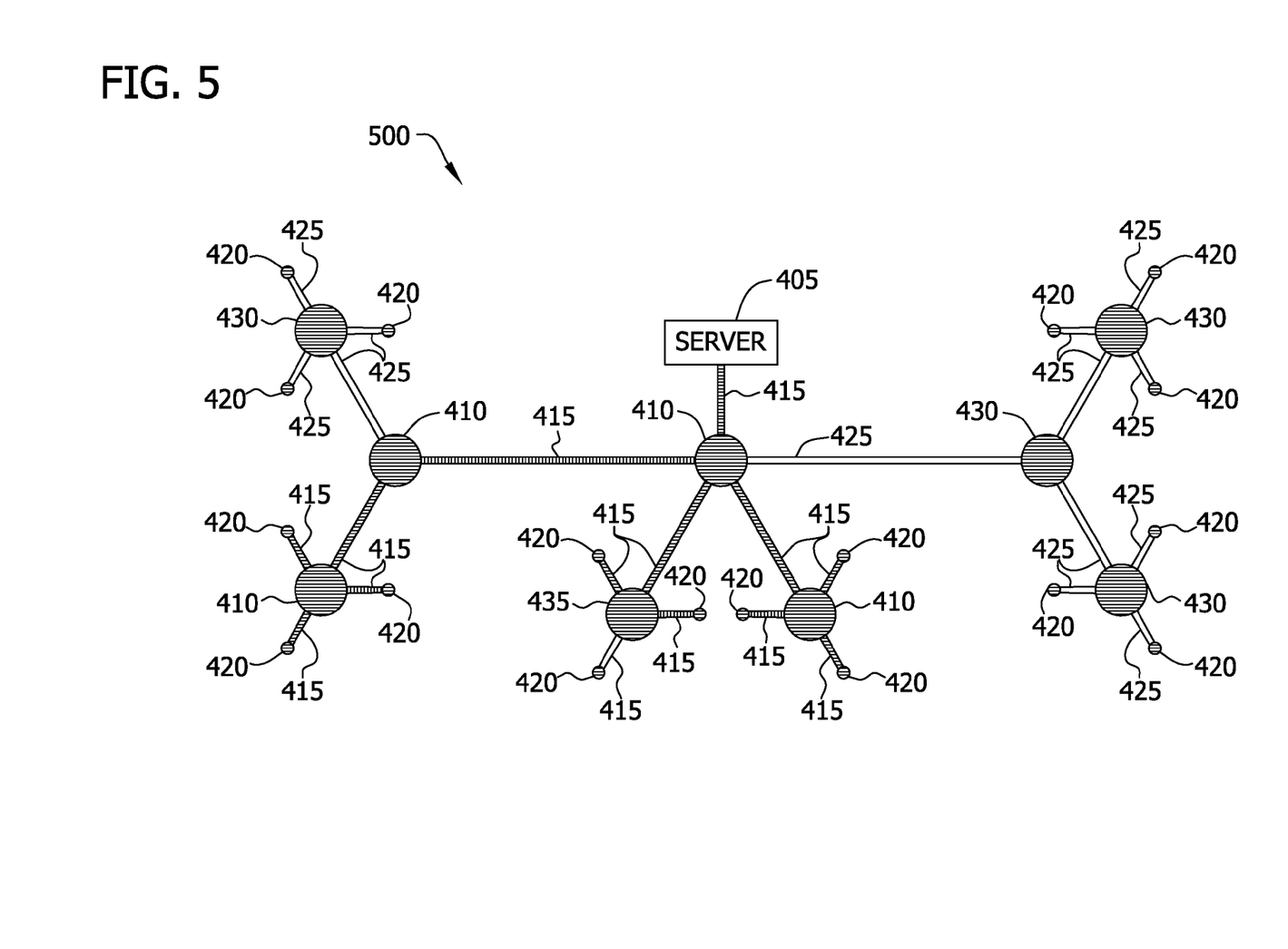
FIG. 5 is an exemplary graphical representation of a communication status in a wind farm network having a star topology.

FIG. 5 is an exemplary graphical representation 500 of a communication status in a wind farm network having a star topology. In a star topology, many switches and/or other network nodes 260 may be connected to a single network switch. Graphical representation 500 includes icons representing server 235, network switches, network nodes 260, and wired network connections, as described above in regard to FIG. 4.

Figure 6:
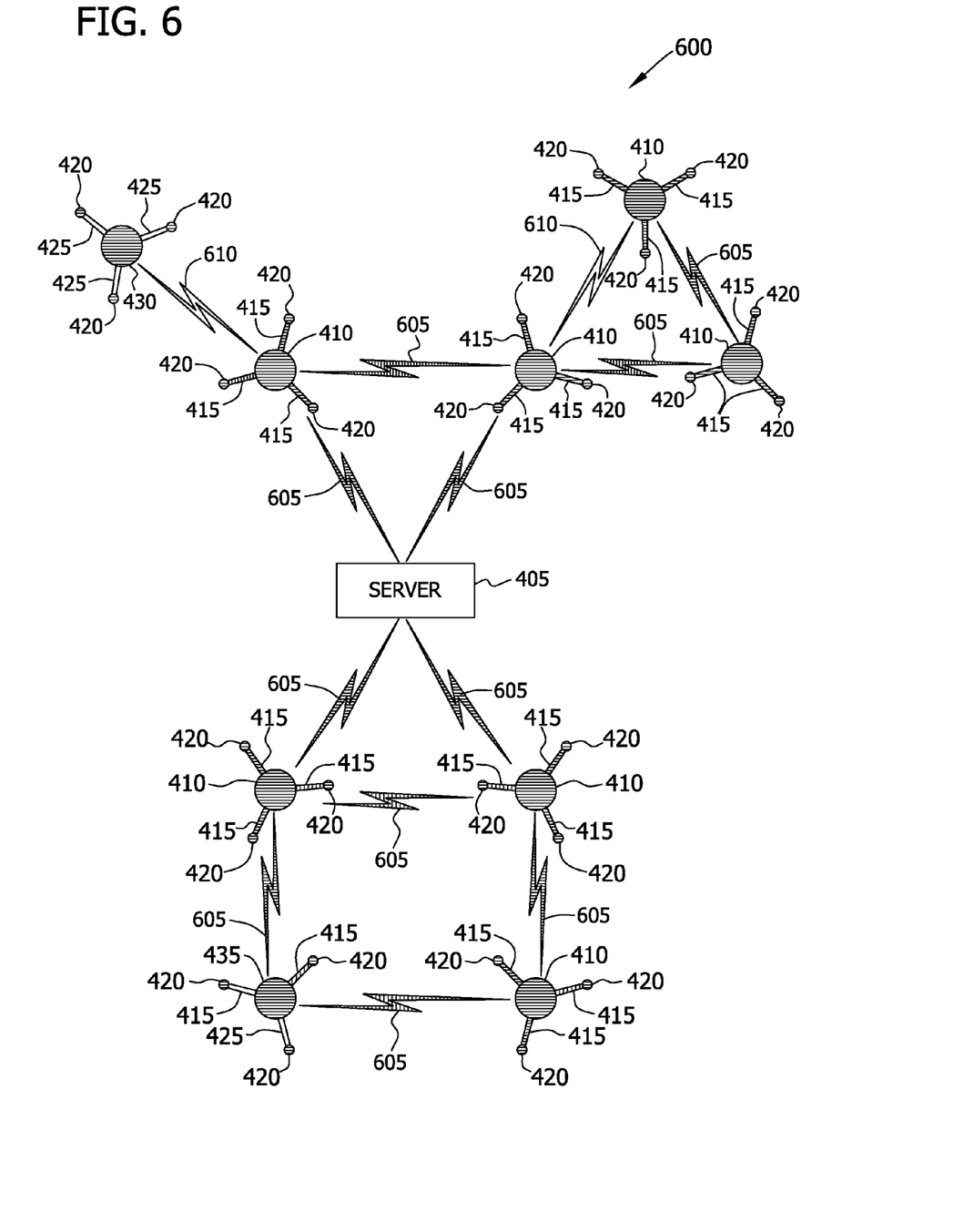
FIG. 6 is an exemplary graphical representation of a communication status in a wind farm network having a wireless mesh topology.

FIG. 6 is an exemplary graphical representation 600 of a communication status in a wind farm network having a wireless mesh topology. In the wireless mesh topology, each wind turbine 100 includes a network switch, network nodes 260, and wired network connections between the switch and network nodes, as described above in regard to FIG. 4. However, as opposed to the fully wired networks depicted in FIGS. 4 and 5, FIG. 6 illustrates a network in which the network switches and the server communicate using wireless connections, as represented by wireless connection icons 605 and 610. In graphical representation 600, hatched wireless connection icons 605 indicate properly functioning wireless connections, and unfilled wireless connection icons 610 indicate malfunctioning wireless connections.

Although FIGS. 4, 5, and 6 each illustrate a single network topology, a graphical representation of communication status may include any combination of wired and wireless connections and any combination of network topologies required to represent the corresponding wind farm network. For example, a first group of switches may be coupled to the wind farm network via wired connections, and a second group of switches may be coupled to the wind farm network via wireless connections. As another example, a first group of switches may be coupled to the wind farm network in a ring topology, and a second group of switches may be coupled to the wind farm network in a star or a wireless mesh topology.

A graphical representation of communication status may simply distinguish between the two classes of properly functioning and malfunctioning network connections. Alternatively, a quality of a connection may be indicated, with the quality ranging from fully malfunctioning to perfectly or fully functioning. A quality of a connection may be determined based on factors such as bandwidth, traffic latency, signal strength, a number of packets retransmitted (in absolute terms or relative to the total number of packets transmitted), a number of packets dropped (again, in absolute or relative terms), and/or any other metric suitable for indicating a quality, a speed, and/or a reliability of a network connection. The metric(s) used for determining quality may be sampled over time. For example, if signal strength is used to determine quality, the signal strength may be sampled periodically, and quality may be determined by computing a mathematical average of recent signal strength readings. A quality of connection may be indicated for a wired or wireless network connection icon by fill pattern (e.g., the hatching in FIG. 4), color, line weight, or animation (e.g., blinking), though other forms of representing quality are also contemplated. For example, quality may be expressed as a percentage, with 100% indicating a perfectly or fully functioning connection. Connections having a quality of 5%, 50%, and 95% may be represented by red, yellow, and green connection icons, respectively.

Figure 7:
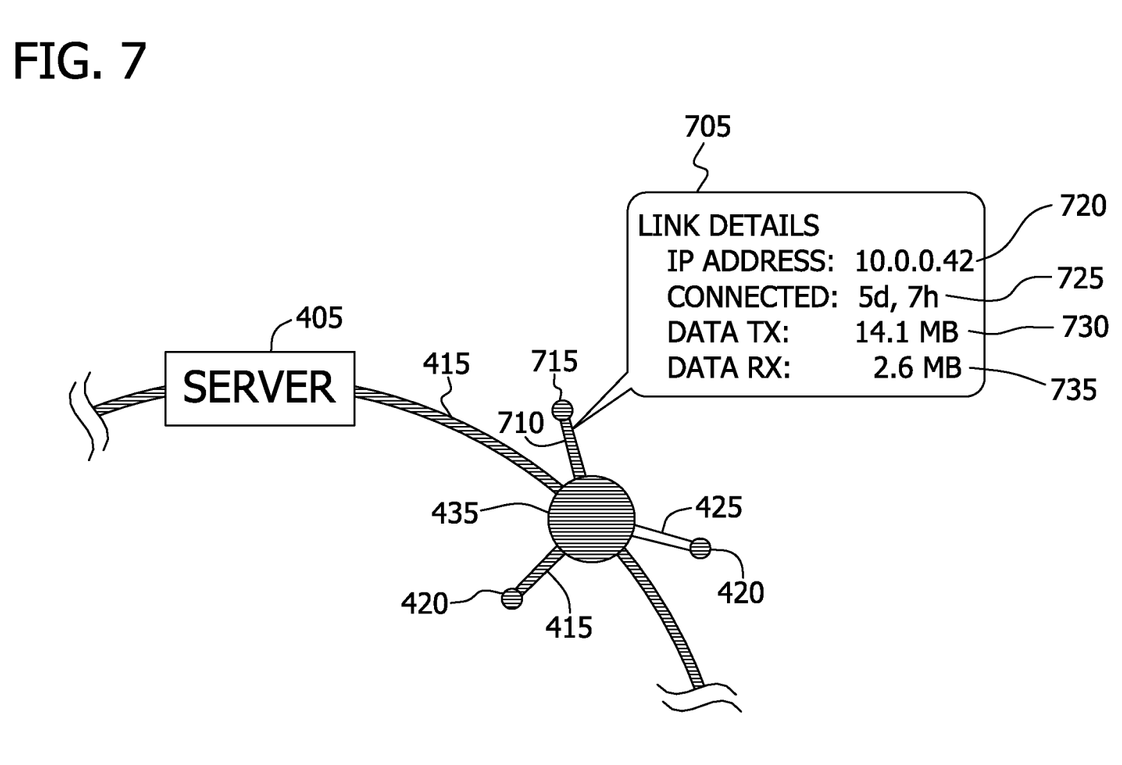
FIG. 7 is an exemplary graphical representation of connection details corresponding to a wind farm network node.

FIG. 7 is an exemplary graphical representation of connection details corresponding to a wind farm network node. For example, such connection details may be included in a connection status or a link state corresponding to the network node. FIG. 7 depicts a portion of a ring-type wind farm network such as that shown in FIG. 4. In addition to the information presented in FIG. 4, connection details are displayed in a connection details area 705. Connection details area 705 includes connection details corresponding to a wired connection icon 710 and/or a network node icon 715. Specifically, the connection details are associated with a network node that is represented by network node icon 715 and is communicatively coupled to switch 435 via a wired connection represented by wired connection icon 710. The displayed connection details include an Internet Protocol (IP) address 720 of the network node, an elapsed time 725 since server 405 became capable of communicating with the network node (i.e., "uptime"), a quantity of data transmitted 730 by the network node, and a quantity of data received 735 by the network node.

Connection details area 705 may be displayed for any network node or connection in a wind farm network. In some embodiments, connection details area 705 is displayed in response to a user selecting a connection icon such as wired connection icon 710 or a network node icon such as network node icon 715. Connection details displayed in connection details area 705 may be static or may be updated periodically. For example, in normal operation, the quantity of data transmitted 730 may continuously increase. The quantity of data transmitted 730 may therefore be updated or "refreshed" once every five seconds or once each minute, for example, though other timings are also contemplated.

A device displaying a graphical representation of wind farm communication status may be configured or programmed to present an alarm in the event of a communication failure. For example, the device may display a visual alarm by displaying a popup message, modifying the appearance of an overall network status indicator, or modifying a screen border or background. The device may also include an audible alarm device, in which case the device may emit an audible alarm using the audible alarm device.

In some embodiments, a remote device initiates communication by issuing a request to a server. The server determines whether the server is capable of communicating with each of the network nodes in the wind farm network and transmits a communication status for the wind farm network to the remote device. The remote device may be configured or programmed to periodically issue such a request (i.e., "poll" the server), receive a response from the server, and redisplay the graphical representation of the communication status.

In some embodiments, the server is programmed to store in a memory a cached version of the communication status with a date and a time at which the server determined the cached version of the communication status. The remote device is configured to provide with a request for communication status a date and a time of the most recent request the remote device issued for the communication status. When the server receives the request, the server determines the current communication status and compares the determined communication status to the cached communication status. If the determined and the cached communication statuses match, and if the date and time provided by the remote device are more recent than the date and time associated with the cached communication status, the server responds by indicating to the remote device that the current communication status matches the communication status the remote device most recently received. The server thereby transmits less data to the remote device.

In some embodiments, the server initiates communication. For example, the server may periodically determine and transmit the communication status to the remote device. The server may also broadcast the communication status or publish the communication status to a message queue, in which case the remote device monitors a communication channel or message queue for messages containing the communication status from the server. The server may maintain a cache, as described above, and broadcast or publish the communication status only when the server detects that the determined communication status does not match the cached communication status.

The embodiments described herein provide a graphical representation of the status of communication within a wind farm network. A user viewing such a graphical representation can quickly evaluate the state of the network and identify malfunctioning communication links. The status of a wind farm network may be viewed remotely, eliminating the expense and delay associated with physically visiting a wind farm. Further, because a user may view the communication status of numerous wind farm networks remotely, network support staff for geographically distributed wind farms may be centralized.

Exemplary embodiments of a wind farm network monitoring system are described above in detail. The monitoring system, wind turbine, and included assemblies are not limited to the specific embodiments described herein, but rather each component may be utilized independently and separately from other components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for monitoring a status of communication in a wind farm network from a remote device, the system comprising:
   a first wind turbine comprising a first network node communicatively coupled to the wind farm network;
   a server comprising:
      a first communication interface communicatively coupled to the wind farm network and programmed to:
         detect the first network node, wherein the first network node is stored in a collection of detected network nodes; and
         determine a first connection status for the first network node in the collection of detected network nodes, the first connection status comprising a quantity of data transmitted by the first network node, a quantity of data received by the first network node, an elapsed time since the server became capable of communicating with the first network node, and a date and a time at which the server became capable of communicating with the first network node and indicating whether the server is capable of communicating with the first network node;
      a second communication interface communicatively coupled to the remote device and configured to transmit a network state comprising the first connection status to the remote device; and,
      a first processor operatively coupled to the first communication interface and the second communication interface; and,
   a remote device configured to:
      receive the network state from the server; and
      display a graphical representation of the network state, wherein the graphical representation indicates whether the server is capable of communicating with the first network node.

2. A system in accordance with claim 1, wherein the graphical representation of the network state comprises:
   a graphical representation of the server;
   a graphical representation of the first network node; and,
   a graphical representation of the first connection status.

3. A system in accordance with claim 1, wherein:
   the first wind turbine further comprises a second network node communicatively coupled to the wind farm network;
   the first communication interface is further programmed to determine a second connection status for the second network node, the second connection status indicating whether the server is capable of communicating with the second network node; and,
   the network state further comprises the second connection status.

4. A system in accordance with claim 1, further comprising a second wind turbine, wherein:
   the second wind turbine comprises a second network node communicatively coupled to the wind farm network;
   the first communication interface is further programmed to determine a second connection status for the second network node, the second connection status indicating whether the server is capable of communicating with the second network node; and,
   the network state further comprises the second connection status.

5. A system in accordance with claim 4, wherein:
   the first communication interface is further configured to detect the second network node;
   the server further comprises a memory configured to store the collection of detected network nodes comprising the first network node and the second network node; and,
   the first communication interface determines a connection status for each of the first network node and the second network node in the collection to determine the first connection status and the second communication status.

6. A system in accordance with claim 1, wherein the first connection status further comprises one or more of the following: a network address of the first network node, and a hardware identifier of the first network node.

7. A device for displaying a network state of a wind farm network, the wind farm network comprising a server communicatively attached to a plurality of wind farm network nodes, the wind farm network state comprising a plurality of wind farm network node states, each of the plurality of wind farm network node states corresponding to a wind farm network node, each of the plurality of wind farm network node states comprising a link state, the device comprising:
   a communication interface communicatively attachable to the server and configured to receive the network state from the server; and,
   a display device configured to:
      display a graphical representation of the plurality of wind farm network node states and a graphical representation of the link states associated with the plurality of wind farm network node states, wherein the link state associated with a wind farm network node state comprises a connection indicator having a value of connected if the server is capable of communicating with the wind farm network node corresponding to the link state, and having a value of disconnected if the server is not capable of communicating with the wind farm network node corresponding to the link state; and
      display connection details corresponding to a wind farm network node of the plurality of wind farm network nodes, the connection details including at least one of an elapsed time since the server became capable of communicating with the wind farm network node, and a date and a time at which the server became capable of communicating with the wind farm network node.

8. A device in accordance with claim 7, wherein:
   the display device is further configured to graphically distinguish a link state having a connection indicator of connected from a link state having a connection indicator of disconnected.

9. A device in accordance with claim 8, wherein the display device is further configured to display at least one of a network address of the wind farm network node and a hardware identifier of the wind farm network node.

10. A device in accordance with claim 7, further comprising a user input device configured to allow a user to select one of the displayed link states, wherein the display device is further configured to display at least one connection detail corresponding to the selected link state.

11. A device in accordance with claim 7, wherein:
   each of the plurality of wind farm network nodes is associated with a position;
   each wind farm network node state further comprises the position of the wind farm network node corresponding to the wind farm network node state; and, the display device is configured to depict each wind farm network node state based on the position of the wind farm network node.

12. A device in accordance with claim 11, wherein the position comprises a position of the wind farm network node relative to other devices within the wind farm network.

13. A device in accordance with claim 11, wherein the position comprises a physical location.

14. A method for presenting a communication status in a wind farm network, the wind farm network comprising a server and a plurality of network nodes, the method comprising:
   associating each network node of the plurality of network nodes with a position comprising a position of each network node relative to other network nodes of the plurality of network nodes;
   requesting the communication status from the server, the communication status comprising a plurality of connection indicators and a plurality of connection details, each of the plurality of connection indicators indicating whether the server is capable of communicating with a corresponding network node of the plurality of network nodes in the wind farm network;
   receiving the communication status from the server; and,
   displaying on a display device a graphical representation of the communication status and connection details corresponding to a network node of the plurality of network nodes, the connection details including at least one of an elapsed time since the server became capable of communicating with the network node, and a date and a time at which the server became capable of communicating with the network node.

15. A method in accordance with claim 14, wherein receiving the communication status from the server comprises receiving an identifier for each corresponding network node.

16. A method in accordance with claim 15, wherein receiving the communication status further comprises receiving at least one of a network address of the corresponding network node and a hardware identifier of the corresponding network node.

17. A method in accordance with claim 16, wherein the graphical representation of the communication status comprises a graphical representation of each connection indicator, the method further comprising:
   enabling a user to select one of the connection indicators; and,
   displaying at least one connection detail for the selected connection indicator, wherein the at least one connection detail includes at least one of the network address and the hardware identifier.

18. A method in accordance with claim 14, wherein displaying on a display device a graphical representation of the communication status comprises:
   displaying on the display device a graphical representation of the server; and
   displaying on the display device a graphical representation of each connection indicator.

19. A method in accordance with claim 18, wherein:
   each of the plurality of network nodes is communicatively coupled to the wind farm network via a type of network connection;
   the communication status further comprises a network topology comprising:
      a plurality of expected network nodes, each expected network node corresponding to a network node in the wind farm network; and,
      the type of network connection for each of the expected network nodes; and,
   displaying the graphical representation of the communication status further comprises displaying on the display device a graphical representation of the network topology.

* * * * *